(12) United States Patent
Jin et al.

(10) Patent No.: US 8,121,287 B2
(45) Date of Patent: *Feb. 21, 2012

(54) SYSTEM, METHOD, AND SERVICE FOR PERFORMING UNIFIED BROADCAST ENCRYPTION AND TRAITOR TRACING FOR DIGITAL CONTENT

(75) Inventors: Hongxia Jin, San Jose, CA (US); Jeffrey Bruce Lotsprech, Henderson, NV (US)

(73) Assignee: International Business Machines Corporation, Armonk, NY (US)

( * ) Notice: Subject to any disclaimer, the term of this patent is extended or adjusted under 35 U.S.C. 154(b) by 575 days.

This patent is subject to a terminal disclaimer.

(21) Appl. No.: 12/133,736

(22) Filed: Jun. 5, 2008

(65) Prior Publication Data

US 2009/0323936 A1 Dec. 31, 2009

Related U.S. Application Data

(63) Continuation of application No. 11/746,491, filed on May 9, 2007, now Pat. No. 7,876,895.

(51) Int. Cl.
*H04K 1/04* (2006.01)
(52) U.S. Cl. .......................... 380/36; 37/202
(58) Field of Classification Search .................. 380/37, 380/36, 202
See application file for complete search history.

(56) References Cited

U.S. PATENT DOCUMENTS

| | | | |
|---|---|---|---|
| 6,886,098 B1 * | 4/2005 | Benaloh ........................ | 713/193 |
| 7,065,210 B1 * | 6/2006 | Tsujii et al. .................... | 380/44 |
| 7,526,086 B2 * | 4/2009 | Kihara et al. ................... | 380/37 |
| 2002/0133701 A1 * | 9/2002 | Lotspiech et al. ............ | 713/163 |
| 2003/0142826 A1 | 7/2003 | Asano | |
| 2003/0198351 A1 | 10/2003 | Foster et al. | |
| 2004/0109569 A1 | 6/2004 | Ellison et al. | |
| 2006/0078110 A1 | 4/2006 | Kim et al. | |

(Continued)

FOREIGN PATENT DOCUMENTS

JP 2003273862 A 9/2003

OTHER PUBLICATIONS

Dalit Naor, Moni Naor, Jeff Lotspiech: "Revocation and Tracing Schemes for Stateless Receivers" [Online] 2001, XP002491877 USA Retrieved from the Internet: URL: http://www.iacr.org/archive/crypto2001/21390040.pdf> [retrieved on Aug. 12, 2008].

(Continued)

*Primary Examiner* — Kambiz Zand
*Assistant Examiner* — Amare F Tabor
(74) *Attorney, Agent, or Firm* — Shimokaji & Assoc., P.C.

(57) ABSTRACT

A unified broadcast encryption system divides a media key tree into S subtrees, divides digital content into segments, and converts some of the segments into variations; the number of segments and variations is q. The system subdivides each of the subtrees into q/|S| subdivided subtrees, assigns a key media variant to each of the subdivided subtrees, and generates a unified media key block ($MKB_u$). The system decrypts digital content by obtaining required key media variants from the $MKB_u$, using the key media variant to find an entry in a variant key table, decrypt a title key, and locate a variant number from the variant key table. The system uses the variant number to identify which of the variations may be decrypted by the title key and uses the title key to decrypt segments and variations.

24 Claims, 6 Drawing Sheets

U.S. PATENT DOCUMENTS

2006/0129490 A1    6/2006    Collar et al.
2006/0153381 A1    7/2006    Kim et al.
2006/0184796 A1    8/2006    Fahrny
2008/0152134 A1    6/2008    Asano

OTHER PUBLICATIONS

Lotspiech J et al: "anonymous Trust: Digital Rights Management Using Broadcast Encryption" Jun. 1, 2004, Proceedings of the IEEE, IEEE. New York, US, pp. 898-909, XP011113011 ISSN: 0018-9219 abstract.

US 2003/142826 A1 (Asano Tomoyuki [JP]) Jul. 31, 2003 Abstract Paragraph [0004]—paragraph [0007].

Patent Cooperation Treaty International Search Report and the Written Opinion dated Aug. 22, 2008.

* cited by examiner

VARIANT KEY TABLE
50

| COLUMN 1 | COLUMN 2 | ... | COLUMN m |
|---|---|---|---|
| $\{K_{t1}\}e(K_{m1}), 1$ | $\{K_{t7}\}e(K_{m1}), 7$ | ... | $\{K_{t20}\}e(K_{m1}), 20$ |
| $\{K_{t1}\}e(K_{m2}), 1$ | $\{K_{t4}\}e(K_{m2}), 4$ | ... | $\{K_{t27}\}e(K_{m2}), 27$ |
| $\{K_{t1}\}e(K_{m3}), 1$ | $\{K_{t2}\}e(K_{m3}), 2$ | ... | $\{K_{t22}\}e(K_{m3}), 22$ |
| ... | ... | ... | ... |
| $\{K_{t1}\}e(K_{mi}), 1$ | $\{K_{t13}\}e(K_{mi}), 13$ | ... | $\{K_{t23}\}e(K_{mi}), 23$ |
| ... | ... | ... | ... |
| $\{K_{t1}\}e(K_{mn}), 1$ | $\{K_{t7}\}e(K_{mn}), 7$ | ... | $\{K_{t29}\}e(K_{mn}), 29$ |

FIG. 3

SYSTEM, METHOD, AND SERVICE FOR PERFORMING UNIFIED BROADCAST ENCRYPTION AND TRAITOR TRACING FOR DIGITAL CONTENT

FIELD OF THE INVENTION

The present invention generally relates to preventing piracy of digital content in a broadcast encryption system. More specifically, the present system relates to identifying devices involved in piracy of digital content and revoking secret keys used to pirate protected digital content.

BACKGROUND OF THE INVENTION

The entertainment industry is in the midst of a digital revolution. Music, television, and movies are increasingly becoming digital, offering new advantages to the consumer in quality and flexibility. At the same time, since digital data can be perfectly and quickly copied, the digital revolution also comprises a threat. If consumers may freely copy entertainment content and offer that content on the Internet, the market for entertainment content may evaporate.

The widespread transition of data from analog format to digital format has exacerbated problems relating to unauthorized copying and redistribution of protected digital content. Flawless copies of content can be easily produced and distributed via the Internet or on physical media. This piracy is a major concern and expense for content providers; to this end, industry consortia have been formed. These groups are licensing agencies that provide content protection tools based on Content Protection for Recordable Media (CPRM) and Advanced Access Content System (AACS), respectively. CPRM is a technology developed and licensed by the 4C group, comprising IBM, Intel, Matsushita, and Toshiba, to allow consumers to make authorized copies of commercial entertainment content where the copyright holder for such content has decided to protect it from unauthorized copying. AACS is a follow-on technology for the same purpose, under development by a group comprising IBM, Intel, Matsushita, Toshiba, Sony, Microsoft, Warner Brothers, and Disney.

CPRM and AACS protected files are encrypted with a key that is specific to a media identifier on the original storage medium (such as a DVD or CD-ROM etc.) of the protected file. Consequently, simply copying the content to another storage medium does not break the protection. The essential building block for CPRM and AACS is structure called a media key block (MKB) that is distributed together with the content. The MKB is a file containing encryptions of a single media key by a large number of keys known by compliant devices.

Each individual compliant device is assigned a set of unique device keys that allow it to decrypt the MKB and obtain the media key from the MKB. The media key is then combined with the media identifier and other values to derive a title key used to decrypt the protected digital content. If a device is revoked, using its device key to decrypt MKB will get garbage instead of a valid media key. By this method, revocation is performed in a typical content protection system such as CPRM and AACS. Details of the CPRM and AACS technology are provided in the applications incorporated by reference and are also available from 4C and AACS.

The cryptographic keys required to indirectly encrypt and decrypt the content are distributed from a key generation facility to device manufacturers and burn-into devices. Maintaining the secrecy of the cryptographic keys is essential for maintaining the integrity of a secure content protection scheme. For example, the device keys assigned to each device must be kept highly confidential. The consequences of accidental or malicious disclosure of the long-lived secret keys are grave; loss of these secrets can lead total breakdown of the copy protection schemes the secrets support and to potentially huge monetary loss for the participants of the copy protection scheme.

Fundamentally, the AACS protection depends on the interaction between tree-based device keys and the media key block [reference is made to Naor et al., "Revocation and Tracing schemes for stateless receivers", CRYPTO 2001, and to U.S. Pat. No. 7,039,803], which allows unlimited, precise cryptographic revocation of compromised devices without danger of collateral damage to innocent devices. One possible pirate attack on this system is that attackers reverse-engineer their devices, extract device keys from the devices, and build a clone device using those extracted device keys. To defend against this type of pirate attack and identify which devices are involved in building the clone device, forensic MKBs are carefully crafted. The forensic MKB is a special purpose MKB that is applied to the clone device. The outcome of applying the forensic MKB to the clone device is observed. After a sequence of applied forensic MKBs and observed outcomes, one can deduce which device keys are used in the clone device. Once the device keys are identified, they can be revoked in the newly-produced MKBs. In the art, finding which devices are involved in building the clone device is called "traitor tracing".

Another type of pirate attack in the above content protection system is an anonymous attack, wherein an attacker or group of attackers tries to hide their secret device keys and operate anonymously. In this attack, the attackers instrument their devices and collude to build a pirate copy of the decrypted plaintext content or the decryption key itself. The attackers can then redistribute the plaintext content or the decryption key. How does one know which devices are involved in constructing the pirate copy when the pirate copy is recovered? One solution is to differently watermark and differently encrypt each movie for each authorized device so that the watermarking and encryption information uniquely identifies the compromised box. Alas, this solution is not feasible because of the excessive computing effort and transmission bandwidth required to prepare and transmit individualized movies. The distribution system is economical only if the movies can be distributed over broadcast channels; i.e., every receiver gets substantially the same data at the same time.

In the art, there is another type of traitor tracing technology that is used to identify which devices are involved in constructing the pirate copy of the content. In one particular instance of this approach, an original version of each movie file is augmented before being broadcast. Specifically, the file that is actually broadcast has had at least one critical file segment replaced by a set of segment variations. Each file segment variation is differently encrypted and also differently watermarked prior to encryption, although the entire file may be watermarked as well. All the variations in one segment are identical for viewing purposes though digitally different. A particular receiver using an assigned secret cryptographic key can decrypt only one of the variations in each segment. All legitimate receivers with valid secret keys can play the content through different segment combinations. If the receiver is compromised and is used to illegally rebroadcast either the keys or the segments themselves, it is possible to deduce which receiver or receivers have been compromised after recovering a sufficient number of pirated content or keys.

After the devices involved in the anonymous attack are identified, the device keys associated with these devices can be revoked in future content releases. To enable revocation, a structure similar to the MKB is used. For example, in AACS, the assigned secret cryptographic keys that enable traitor tracing for anonymous attack are called sequence keys, similar to device keys. The structure that can incorporate revocation information is called a sequence key block (SKB). Any compliant device can use its valid sequence key to process the SKB and obtain a key that can indirectly decrypt the content.

Although conventional traitor tracing technology has proven to be useful, it would be desirable to present additional improvements. Current content protection systems such as AACS utilize two separate systems, the media key block and the sequence key block. The media key block is tree-based and is used to thwart an attack in which a clone device is constructed from a set of pirated device keys. The clone device can be illegally used to copy copyrighted content and can be sold on the black market. The sequence key block is matrix-based, and is used to thwart an attack in which sequence keys, title keys, or an entire decrypted movie is re-distributed. Utilizing two separate systems requires additional storage on media and calculation by the media device, affecting performance of a digital content system.

Furthermore, deploying two separate systems is inefficient and time consuming. Using media key blocks to revoke traitors provides good revocation provided that traitors can be identified when clone devices are recovered. However, this type of tracing based on forensic MKBs may take an excess amount of time and the scheme can be overwhelmed. On the other hand, using sequence key blocks provides good tracing, but revocation is limited. Further, as sequence keys are revoked in the sequence key block, tracing capability is degraded.

What is therefore needed is a system, a service, a computer program product, and an associated method for performing unified broadcast encryption and traitor tracing for digital content that combines sequence key protection with a media key block, providing a more efficient and simpler approach for tracing and revoking traitors. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for performing unified broadcast encryption and traitor tracing for digital content.

The present system seamlessly combines a unified broadcast encryption system and a traitor tracing system to provide both good tracing and perfect revocation capability. The present system uses one set of keys (device keys) from a broadcast encryption system. The present system further employs additional media keys in a unified media key block ($MKB_u$) instead of a single media key as is used in current broadcast encryption schemes. Those additional media keys replace the sequence keys typically used in a traitor tracing system. The content is prepared in a manner similar to a traitor tracing system, with additional variations of some chosen segments in the content. Processing this new unified media key block can directly obtain different valid media keys for different devices, ultimately enabling devices to play back the content through different variations in the content. In the conventional AACS system, devices have to process both the MKB and the SKB to obtain a media key variant; the device uses the media key variant to process a segment of the content that has more than one variation.

Furthermore, the present system uses one or more variant key tables. Each entry in the variant key table contains a title key encrypted by a valid media key variant for a segment of the content. One title key encrypts a segment that does not have variations. Additional title keys encrypt a segment that has variations. During play back, a device first reads and processes the unified media key block on a medium to obtain a valid media key variant. The device uses the media key variant to look up the variant key table, decrypt from the variant key table a title key, and locate a variant number for each segment. The device uses the variant number to identify which of the variations in the segment may be decrypted by the title key and uses the title key to decrypt the variation for the segment.

When probing a clone device in order to trace which device keys are in the clone, the present system enables anonymous attack traceability of similar quality as that of a sequence key system. In a conventional system, the forensic MKB probing can only determine whether or not the clone plays back the content. In the present system, forensic unified MKB probing can also determine which variations the clone plays. The present system enables gaining more information from each probe than possible with conventional systems.

The present system distributes additional media keys among the devices. For example, in a tree-based system, each node corresponds to a subtree rooted at this node. Each subtree is associated with a key (called subtree key). The present system divides a tree into S subtrees, divides the digital content into a plurality of segments, and converts at least some of the segments into a plurality of variations such that the number of different versions of the content created is equivalent to a quantity q. If an absolute value of S is not greater than q/2, the present system subdivides each of the subtrees into a plurality of subdivided subtrees of a quantity q/|S|. The present system assigns a separate media key variant to each of the subdivided subtrees. The present system generates a unified media key block by encrypting each media key variant with the subtree key associated with the subtree that is assigned that media key variant.

The present system traces a traitor by iteratively identifying a variation used by the traitor to circumvent the encrypted digital content and by identifying the subtree corresponding to that variation. When a subtree is identified, in next iteration the present system subdivides the identified subtree and re-distributes additional media key variants among the subdivided subtrees. This subdivision is repeated, based on the identified results of the previous step in the iteration. The iteration ends when a subdivided subtree is a leaf of the tree; at that time the traitor is identified and can be revoked in newly released content.

The present system may be embodied in a utility program such as a unified broadcast encryption utility program. The present system provides a method for the user to provide content for encryption and then invoke the unified broadcast encryption utility to divide the content into segments, with some of the segments replaced by a number of possible variants, and then encrypt the segments using a unified media key block and variant key table. The unified broadcast encryption utility provides the unified media key block and the variant key table for use by authorized media players in decrypting the encrypted content. The present system further provides a method for the user to provide a clone or recovered pirated encrypted content to the unified broadcast encryption utility. The unified broadcast encryption utility traces the traitor by identifying a variation and a subtree of the unified media key block used in the clone or used to generate the pirated movie. The unified broadcast encryption utility then revokes the subtree in any future unified media key blocks, preventing future piracy by the traced traitor.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 3 is a diagram of an exemplary variant key table used by the unified broadcast encryption system of FIG. 1 to decrypt encrypted content;

DETAILED DESCRIPTION OF PREFERRED EMBODIMENTS

The following definitions and explanations provide background information pertaining to the technical field of the present invention, and are intended to facilitate the understanding of the present invention without limiting its scope:

Media Key Variant (Kmv): Any of several valid media keys obtained by processing the unified media key block. In contrast, conventional processing of a conventional media key block obtains one media key.

Unified Media Key Block ($MKB_u$): A structure comprising different media key variants encrypted by different device keys. Compliant devices obtain different valid media key variants after processing the $MKB_u$.

Variant Key Table: A table that allows a device with a media key variant to calculate a list of title keys. Rows of the table are indexed by Kmv. Columns of the table comprise the segments for the content. Each entry ij in the table contains the title key encrypted by $Kmv_i$ for segment j.

Title Key ($K_t$): The key used to encrypt and decrypt the content. In the present system, the content is divided into multiple segments. Some of the segments are chosen to have multiple variations and each variation is encrypted by different title key.

Figure 1:
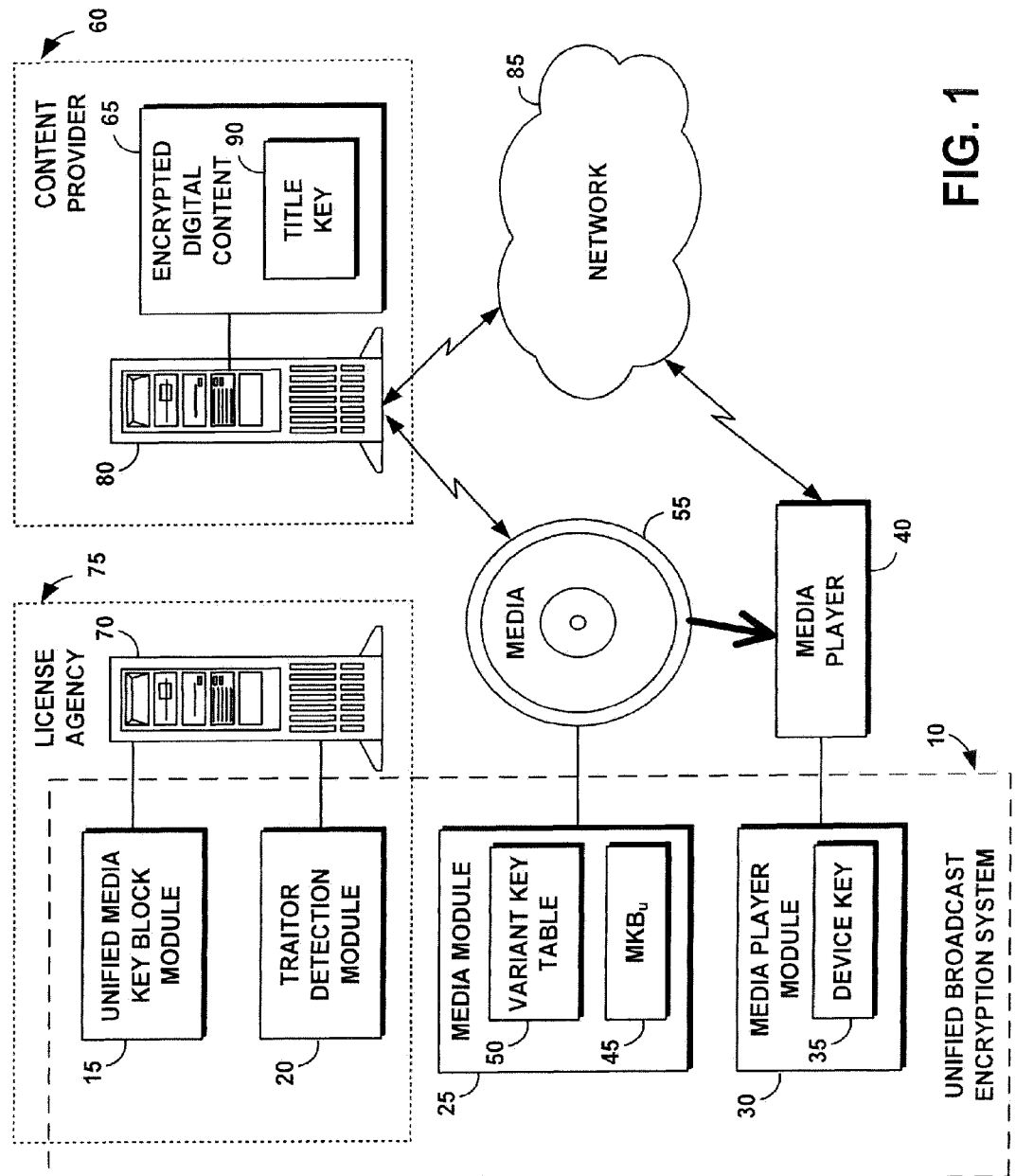
FIG. 1 is a schematic illustration of an exemplary operating environment in which a unified broadcast encryption system of the present invention can be used.

FIG. 1 portrays an exemplary overall environment in which a system, a service, a computer program product, and an associated method (the unified broadcast encryption system 10 or the "system 10") for performing unified broadcast encryption and traitor tracing for digital content according to the present invention may be used. System 10 comprises a unified media key block module 15, a traitor detection module 20, a media module 25, and a media player module 30.

The media player module 30 comprises a device key 35 that is uniquely associated with a media player 40. The media player module 30 further comprises a software programming code or a computer program product that is typically embedded within, or installed on the media player 40.

The media module 25 comprises a unified media key block 45 (interchangeably reference herein as $MKB_u$ 45) and a variant key table 50. The unified media key block 45 comprises a subset of available device keys and a data part in which each of the subset of device keys individually encrypts a set of media key variants. For example, the subset of device keys may be organized in a tree structure, such as in the subset-difference broadcast encryption scheme referenced previously, although all broadcast encryption schemes are within the scope of this invention. The media module 25 comprises a software programming code or a computer program product that is saved onto a medium 55.

The unified media key block module 15 generates one or more unified media key blocks for use by a content provider 60 to place on the medium 55 together with an encrypted digital content 65 (interchangeably referenced herein as encrypted content 65). The unified media key block module 15 comprises a software programming code or a computer program product that is typically embedded within, or installed on a server 70 that belongs to a separate facility, for example, a license agency 75. Alternatively, system 10 can be saved on a suitable memory or storage medium such as a diskette, a CD, a DVD, a hard drive, or like devices.

The traitor detection module 20 identifies the device keys that have been compromised by a traitor or have been pirated. The traitor detection module 20 passes the identified device keys to the unified media key block module 15 to revoke those identified device keys from any future unified media key blocks, preventing further piracy by that traitor or attacker. The traitor detection module 20 comprises a software programming code or computer program product that is shown, for illustration purposes only, as embedded within, or installed on server 70 of the license agency 75. Alternatively, the traitor detection module 20 may be installed in a separate facility other than the one that issues unified media key blocks to content providers.

The media player 40 can access a server 80 of the content provider 60 through a network 85 to obtain the encrypted digital content 65 and a title key 90. The title key 90 (interchangeably referenced herein as $K_t$ 90) allows the media player 40 to decrypt and play the encrypted content 65 after the encrypted content 65 has been recorded to a medium 55. The title key 90 is encrypted, and requires the media player 40 to correctly process the unified media key block 45 to decrypt and use the unified media key block 45. The content provider 60 may record the encrypted content 65 and the encrypted title key 90 directly to the medium 55 such as, for example, a CD or DVD. A user may then obtain the encrypted content 65 by, for example, purchasing the CD.

The media player 40 comprises software that allows the media player 40 to interface securely with the content provider 60. The media player 40 comprises any compliant module that can verify the physical presence of a medium 55 such as, for example, a disk. A compliant module is one that follows the usage rules of the media module 25 that are cryptographically bound to medium 55. For example, a compliant recorder does not record content encoded "do not copy".

FIG. 1 illustrates an exemplary application of system 10 referenced as "electronic sell-through" in which a consumer obtains the encrypted content 65 by downloading the encrypted content 65 from the content provider 60 onto a medium 55 such as a recordable disk in the home of the consumer. While described in terms of an "electronic sell-through" application, it should be clear that system 10 is applicable as well to, for example, any application in which authentication is important and the authenticators are restricted to a subset of the participants. Furthermore, while illustrated as providing secure encryption of content for delivery to media, it should be clear that system 10 is applicable as well to, for example, any type of content delivery.

System 10 can take the form of an entirely hardware embodiment, an entirely software embodiment or an embodiment containing both hardware and software elements. In one embodiment, system 10 is implemented in software, which includes but is not limited to firmware, resident software, microcode, etc.

Furthermore, system 10 can take the form of a computer program product accessible from a computer-usable or computer-readable medium providing program code for use by or in connection with a computer or any instruction execution system. The computer program product comprises the instructions that implement a method of system 10. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Figure 2:
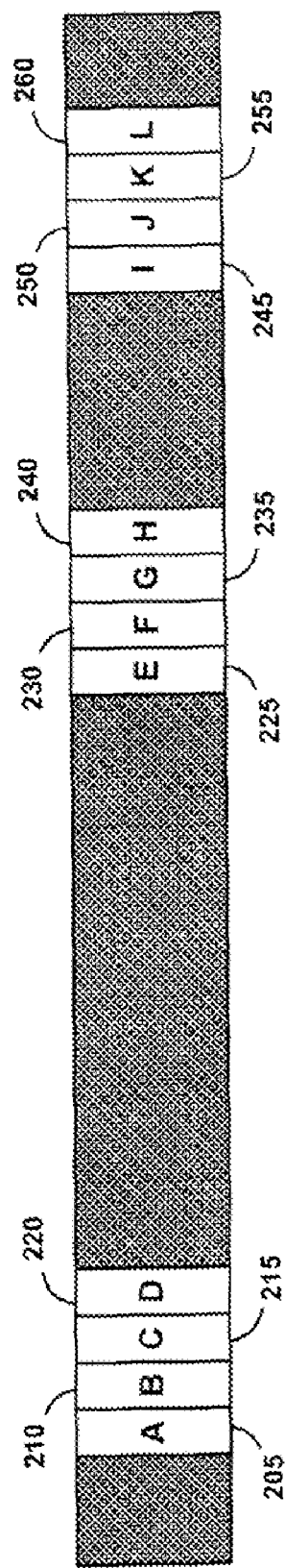
FIG. 2 is a block diagram of an encrypted content using an augmented file and encrypted variations as utilized by the unified broadcast encryption system of FIG. 1.

FIG. 2 illustrates a diagram of a conventional modified or augmented distributed file 200 comprising encrypted content 65. This file is described in detail in U.S. Ser. No. 10/315,395, filed Dec. 9, 2002, entitled "Method for Tracing Traitors and Preventing Piracy of Digital Content in a Broadcast Encryption System", which is incorporated by reference herein. The augmented file 200 is the modified version of an original file to be broadcast or distributed on prerecorded media. The augmented file 200 comprises sets of file variations that replaced critical file segments. For example, a first critical file segment has been replaced with variations 205, 210, 215, and 220, while a second critical file segment has been replaced with variations 225, 230, 235, and 240, and so forth.

Each file segment variation is a copy of the particular corresponding critical file segment that has been differently watermarked and differently encrypted using a variation encrypting key (called title key for the variation). Each file segment variation is identified by a text designation in this application (e.g. A, B, C . . . etc.) for clarity, but in practice binary numbers are generally employed for this purpose. Furthermore, while four variations are shown for each critical file segment, in operation any number of variations may replace a critical file segment. In one embodiment, approximately 12 to 16 variations are used per critical file segment, with approximately 250 to 1000 variations per augmented file 200.

The number of critical file segments and the number of file segment variations employed depends on the properties of the file and its audience. For movies, one may select a single critical file segment and have several hundred file segment variations; however, attackers may simply choose to omit that single critical file segment in a pirated copy of the file, in hopes that viewers may not find such a glitch to be overly annoying. A pirated movie with, for example, 15 missing critical 5-second scenes is most likely too annoying to any viewer for it to be of any commercial value. Thus, the illegally broadcast movies are either substantially disrupted or the attackers must incorporate some of their file segment variations, which facilitates unified traitor tracing.

Each intended receiver of the broadcast requires variation selection information to choose a particular combination of file segment variations for each file. In terms of a movie rental box scenario, each movie rental box knows, for each movie, which set of variations to plug into the spaces where critical scenes existed in the original movie. The particular arrangement of unmodified file content and file segment variations within the augmented file 200 shown is not critical but is merely intuitive.

The variations facilitate unified traitor tracing in a commercially viable (i.e. low bandwidth overhead) manner. If a pirated version of a file is found, say on the Internet, the identity of the particular movie rental box (or boxes) that was used to create the pirated version is of keen interest to the broadcaster and/or content creator (e.g. copyright owners). The broadcaster and/or content creator may institute legal proceedings against the culprit, and would certainly want to refuse to send new decryption keys to the compromised boxes to prevent future thievery. If different boxes are assigned different combinations of file segment variations to use, an analysis of a pirated file can help determine which boxes were used as part of an anonymous attack.

In the event that all of the file segment variations in a redistributed version of a file match the combination of file segment variations assigned to only a single movie rental box, conventional systems normally identify that box as being the source of the redistributed file. However, attackers are becoming increasingly sophisticated and may choose to employ a number of boxes to produce a pirated version of a file via collusion, wherein each box contributes some information or content used to produce the illicit copy after enough such information or content has been accumulated.

In conventional broadcast encryption technologies, a media key block resides on a physical piece of media such as a DVD. The media player uses a device key uniquely associated with the media player to decrypt the media key block and obtain a media key, $K_m$, and a title key, $K_t$. In the example of AACS that deploys both a media key block system and a sequence key block (SKB) systems, the media key is used as input for processing a sequence key block to obtain a media key variant, $K_{mv}$. The title key is used to decrypt segments in the augmented file 200. The media key variant is used to obtain the title key for each segment.

In contrast, system 10 utilizes the variant key table 50 in which a different title key may be used for each variation in a segment in the augmented file 200. Rather than having a separate sequence key block, system 10 merges indirection concepts used by the sequence key block and the title key into the variant key table.

FIG. 3 illustrates an exemplary variant key table 50. The variant key table 50 comprises one or more exemplary columns such as a column 1, 305, a column 2, 310, and a column m, 315, collectively referenced as columns 320. The variant key table 50 comprises rows such as a row 1, 325, a row 2, 330, a row 3, 335, a row i, 340, through a row n, 345, collectively referenced as rows 350. Rows 350 are generically referenced as the row i, 340. Each of the rows 350 in the variant key table 50 corresponds to a media key variant. For example, the row i, 340, corresponds to a media key variant i. Each of the columns 320 in the variant key table 50 corresponds to a segment in the encrypted digital content 65. For example, column 1, 305, corresponds to a segment in the encrypted digital content 65 in which there are no variations, and every media player calculates the same title key. The column 2, 310, and the column m, 315, each corresponds to segments in the encrypted digital content 65 of which there are variations; different media player modules such as the media player module 30 may use different title keys to decrypt the variations. The assignment of columns is for exemplary purposes only. The encrypted digital content 65 may comprise one or more segments without variations and zero or more segments with variations. Each segment of the encrypted digital content 65 has a corresponding column in the variant key table 50.

Entries in the variant key table 50 comprise two values, an encrypted title key and a variant number. These values are denoted as "$(K_{tx})e(K_{mi}),x$" in FIG. 3. For example, in column 1, 305, all the entries show variant 1, but in each entry the title key ($K_{t1}$) corresponding to this segment is differently encrypted: the title key, $K_t$, is encrypted with the media key variant. The column 2, 310, corresponds to a point in the movie in which there are variations. The column 2, 310, comprises different variant numbers, one variant number for each variation. In general, there are fewer variations at any given point in the movie than there are media key variants; consequently contents of rows may repeat within the variant key table 50 as illustrated by the row 1, 325, and the row n, 345.

The media player module 30 accesses a row in the variant key table 50 based on the media key variant of the media player module 30. For example, if the media player module 30 has media key variant i, the media player module 30 uses row i, 340, in the variant key table 50. From entries in the accessed row, the media player 40 is able to decrypt title keys for each segment in the encrypted digital content 65 and to identify which variation to use in those segments that have more than one variation. The media player 40 obtains the necessary media key variant number from the unified media key block 15 by, for example, a special field. Alternatively, low-order bits of the media key variant can be used to identify the media key variant number. This approach slightly reduces the strength of the key, but allows compatibility with conventional (non-unified) media key blocks.

If a single value is encrypted by many different keys, as is being done especially in the column 1, 305, of the example variant key table 50, system 10 is susceptible to an attack called the Birthday Paradox Attack. It is a simple matter to avoid this attack by, for example, XORing the title key with the row number before encrypting it with the media key variant. This normal practice is not shown in FIG. 3, for purposes of clarity, but may used in one embodiment.

Figure 4:
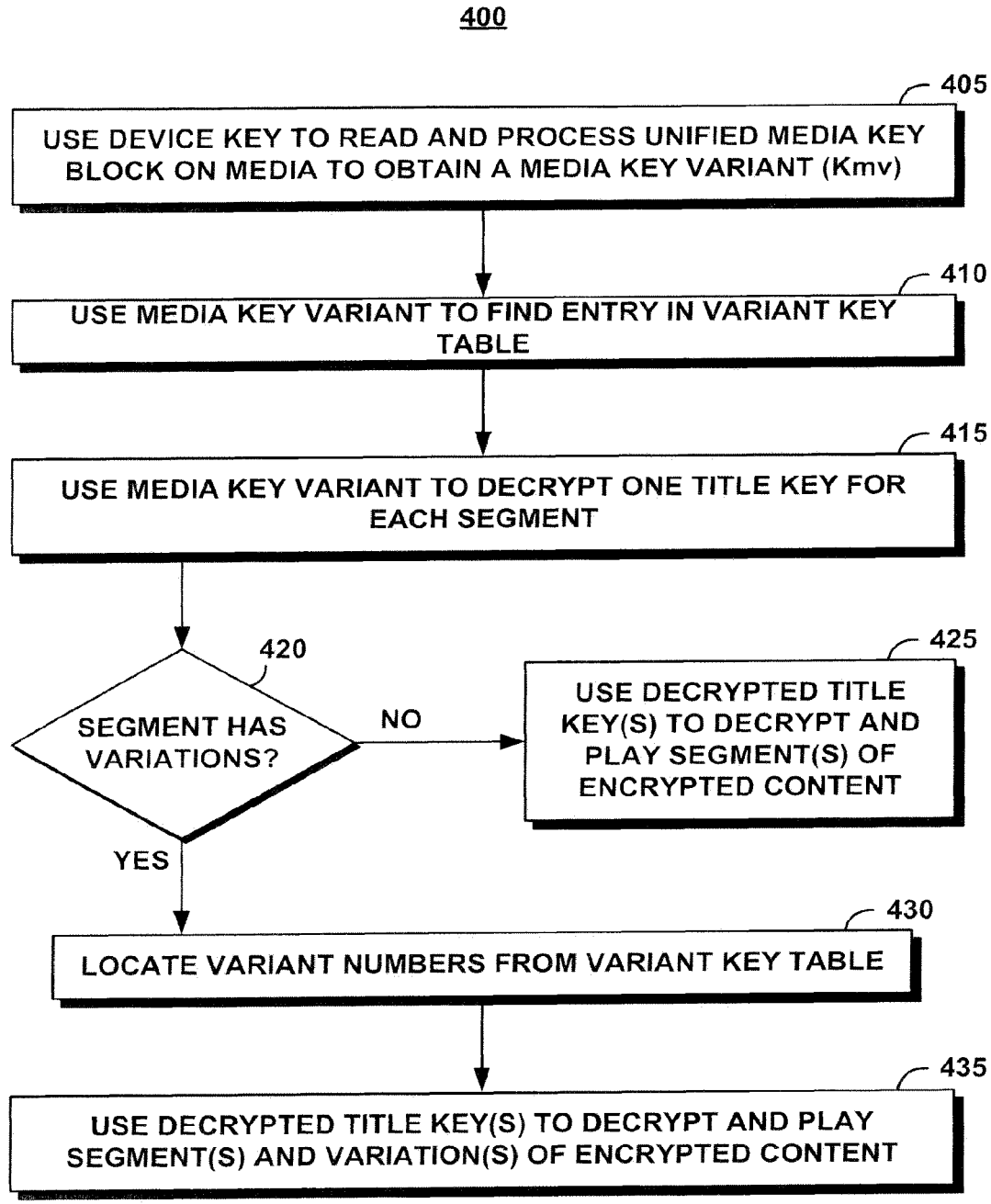
FIG. 4 is a process flow chart illustrating a method of operation of the unified broadcast encryption system of FIG. 1 in decrypting encrypted content.

FIG. 4 illustrates a method 400 of the media player module 30 playing the encrypted content 65 on media 55 using a unified media key block 5 and the variant key table 50. The media player module 30 uses the device key 35 to read and process the unified media key block 45 on media 55 to obtain a media key variant ($K_{mv}$) (step 405).

The media player module 30 uses the media key variant to find an entry in the variant key table 50 (step 410). The media player module 30 uses the media key variant to decrypt one title key for each segment (step 415). The media player module 30 determines whether a segment has variations (decision step 420). If no, the media player module 30 uses the decrypted title key(s) to decrypt and play segment(s) of the encrypted content 65 (step 425). For a segment with variations, the media player module 30 locates variant numbers corresponding to the variations from the variant key table 50 (step 430). The media player module 30 uses the decrypted title keys to decrypt and play segment(s) and variation(s) of the segments of the encrypted content 65 (step 435).

An attacker wishes to circumvent the system and access the encrypted content 65 without authorization. To circumvent the system, the attacker may distribute a clone with pirated device keys that can play back the encrypted content as if the clone were a legal device. The attacker may also distribute media key variants or title keys to the encrypted content or distribute the encrypted content in an unencrypted format. System 10 enables identification of a media player or set of media players used by the attacker to perpetrate any of these attacks. Having identified the media player or set of media players, system 10 revokes the media player or set of media players, preventing those media players from playing any encrypted content released after revocation of the media player or set of media players. System 10 exhibits good revocation capability and good tracing capability that is sustainable as media players are identified and revoked.

Figure 5A:
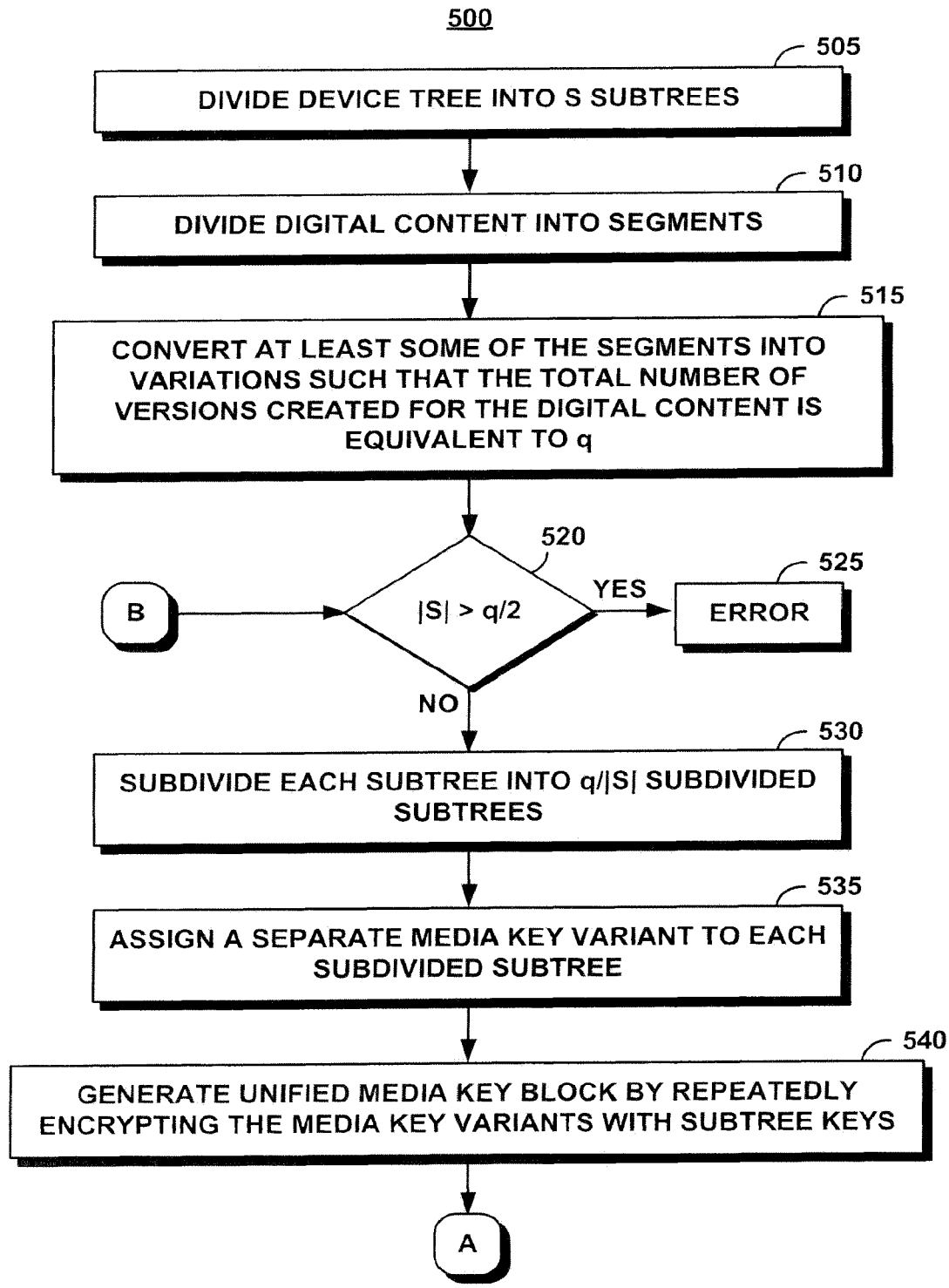
FIG. 5 is comprised of FIGS. 5A and 5B, and represents a process flow chart illustrating a method of the unified broadcast encryption system of FIG. 1 in generating a unified media key block, tracing a traitor, and revoking a compromised media player.
Figure 5B:
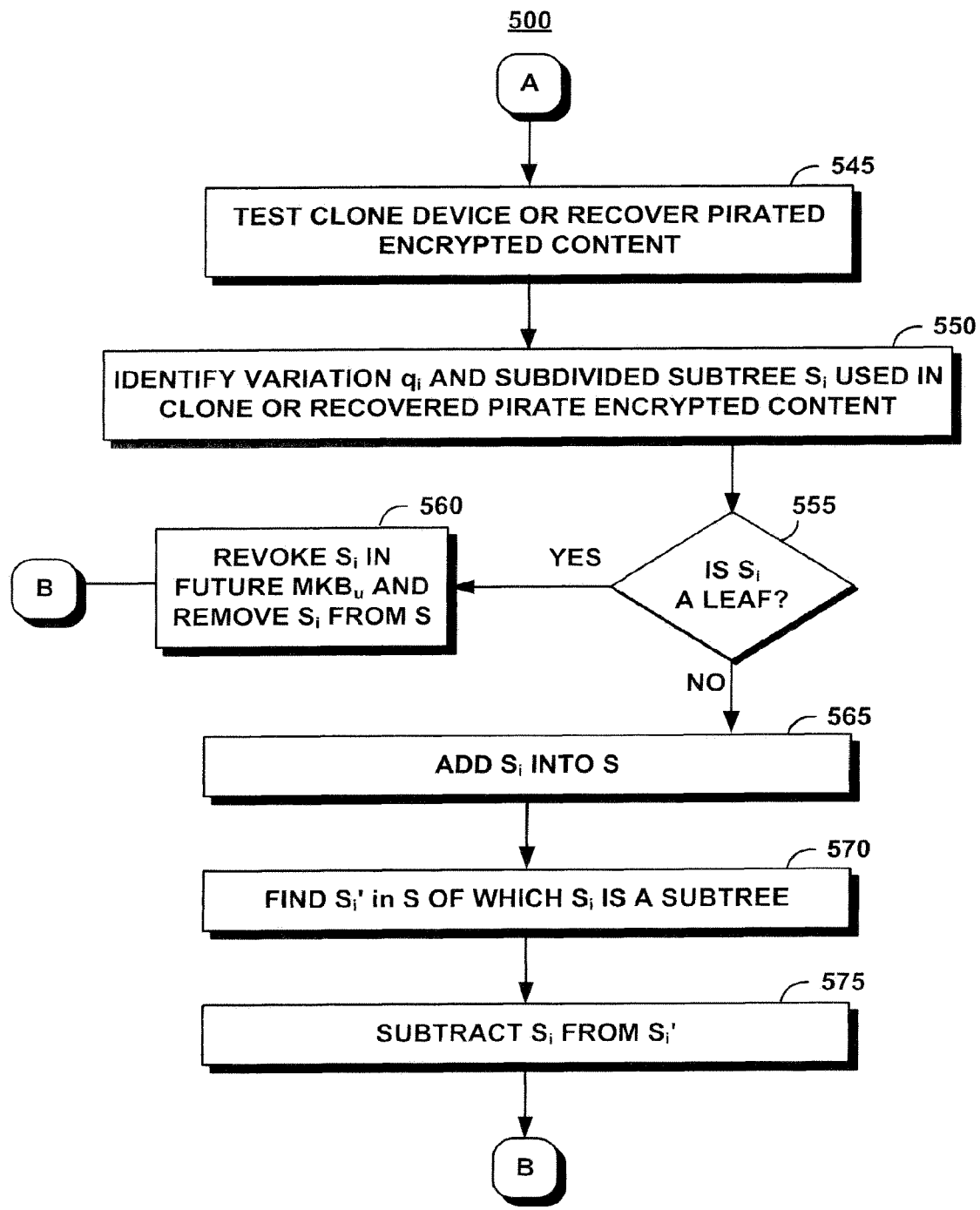

FIG. 5 (FIGS. 5A and 5B) illustrates a method 500 of system 10 in generating a unified media key block, tracing a traitor, and revoking a compromised media player. The unified media key block module 15 divides a device tree into S subtrees (step 505). The unified media key block module 15 divides the digital content into segments (step 510). The unified media key block module 15 converts at least some of the segments into variations such that the total number of versions created for the content is equivalent to q (step 515).

The unified media key block module 15 determines (decision step 520) whether:

$$|S| > \frac{q}{2}.$$

If yes, the method exits with an error (step 525). (In the error case, some convention method for tracing media key blocks may be attempted.) If no, the unified media key block module 15 subdivides each subtree into q/|S| subdivided subtrees (step 530). The unified media key block module 15 assigns a separate media key variant to each subdivided subtree (step 535). The unified media key block 15 generates a unified media key block by repeatedly encrypting the media key variants with subtree keys (step 540).

An attacker has generated a clone device or pirated the encrypted content 65. The traitor detection module 20 tests the clone device or recovers the pirated encrypted content (step 545). The traitor detection module 20 identifies a variation $q_i$ and subtree $S_i$ used in the clone or the recovered pirated encrypted content (step 550). The traitor detection module 20 determines whether the identified $S_i$ is a leaf in the unified media key block (decision step 555). If yes, the traitor detection module 20 revokes $S_i$ in any future unified media key blocks and removes $S_i$ from S (step 560). System 10 returns to decision step 520 to generate any additional unified media key blocks.

If, at decision step 555, the identified $S_i$ is not a leaf in the unified media key block, the traitor detection module 20 adds $S_i$ into S (step 565). The traitor detection module 20 finds $S_i'$ in S of which $S_i$ is a subtree (step 570). The traitor detection module 20 subtracts $S_i$ from $S_i'$ (step 575) and returns to decision step 520 to generate any additional unified media key blocks.

In step 565, the traitor detection module 20 adds subtree $S_i$ into the set of currently active subtrees (the "frontier"), S. $S_i$ must also be a proper subtree of one of the other subtrees in S; the traitor detection module 20 ensures the subtree $S_i$ is not double-counted. Thus in step 570 the traitor detection module 20 identifies the other subtree, called $S_i'$. Then in step 575, the traitor detection module 20 subtracts $S_i$ from $S_i'$, and replaces the resulting subtree(s) $S_i'$ in the frontier S. It is noted that subtracting one subtree from a larger subtree does not always yield a single subtree: it might generate two or even more subtrees. In this case, those multiple subtrees would be treated exactly as if they were a single subtree in future steps. For clarity of explanation, this detail has been omitted, and the term "subtree" in this invention should be read as "one or more subtrees being treated as a single subtree after subtree subtraction".

System 10 initially distinguishes between, for example, only manufacturers of devices or models in an initial unified media key block. As the unified media key block is attacked, system 10 introduces additional detail in models and individual media players within the extended leaves to the unified media key block. Eventually, enough information is iteratively gained in step 550 to identify the traitor (a specific media player) on the leaves and revoke a specific media player involved in an attack. Consequently, the unified media key block of system 10 encompasses both traitor tracing and revocation.

It is to be understood that the specific embodiments of the invention that have been described are merely illustrative of certain applications of the principle of the present invention. Numerous modifications may be made to the system, method, and service for performing unified broadcast encryption and traitor tracing for digital content described herein without departing from the spirit and scope of the present invention.

What is claimed is:

1. A processor-implemented method of performing a unified broadcast encryption and a traitor tracing for a digital content, comprising:
   dividing a tree-based media key block, such that most encryptions in the tree-based media key block do not correspond to individual devices, into S subtrees;
   dividing the digital content into a plurality of segments and converting at least some of the segments into a plurality of variations so that the sum of the number of the unconverted segments plus the number of the plurality of variations is equivalent to a quantity q;
   upon determination that the absolute value of S is not greater than q/2, subdividing each of the subtrees into q/|S| subdivided subtrees, such that there are greater than two subdivided subtrees;
   assigning a separate media key variant to each of the subdivided subtrees and storing the media key variant in a variant key table; and
   generating a unified media key block so that the digital content is encrypted by a unified media key block.

2. The method of claim 1, further comprising decrypting the digital content by reading and processing the media key block on a medium to obtain the key media variant required for each of the variations of the digital content.

3. The method of claim 1, further comprising decrypting the digital content by using the key media variant to find an entry in the variant key table.

4. The method of claim 1, further comprising decrypting the digital content by decrypting a title key and locating a variant number from the variant key table using the key media variant.

5. The method of claim 1, further comprising decrypting the digital content that includes the title key such that playing the segments and the variations is enabled.

6. The method of claim 1, further comprising tracing a traitor by identifying a variation and a subdivided subtree used by the traitor to circumvent the encrypted digital content.

7. The method of claim 1, further comprising revoking a traitor using the identified variation and the identified subdivided subtree by removing the identified subdivided subtree from an associated subtree if the subdivided subtree is a leaf of the tree-based media key block.

8. The method of claim 1, further comprising decrypting the encrypted digital content using the unified media key block and the variant key table.

9. A processor-implemented system for performing a unified broadcast encryption and a traitor tracing for a digital content, comprising:
   a unified media key block module for dividing a tree-based media key block, such that most encryptions in the tree-based media key block do not correspond to individual devices, into S subtrees;
   the unified media key block module dividing the digital content into a plurality of segments and converting at least some of the segments into a plurality of variations so that the sum of the number of the segments plus the number of the variations is equivalent to a quantity q;
   upon determination that the absolute value of S is not greater than q/2, the unified media key block module subdividing each of the subtrees into q/|S| subdivided subtrees, such that there are greater than two subdivided subtrees;
   the unified media key block module assigning a separate media key variant to each of the subdivided subtrees, and storing the media key variant in a variant key table; and
   the unified media key block module generating a unified media key block so that the digital content is encrypted by a unified media key block.

10. The system of claim 9, wherein a media player decrypts the digital content by reading and processing the media key block on a medium to obtain the key media variant required for each of the variations of the digital content.

11. The system of claim 9, wherein a media player decrypts the digital content by using the key media variant to find an entry in the variant key table.

12. The system of claim 9, wherein a media player decrypts the digital content by a title key and locating a variant number from the variant key table using the key media variant.

13. The system of claim 9, wherein a media player decrypts the digital content by using the decrypted title key to decrypt and play the segments and the variations.

14. The system of claim 9, further comprising a traitor detection module for tracing a traitor by identifying a variation and a subdivided subtree used by the traitor to circumvent the encrypted digital content.

15. The system of claim 9, further comprising a traitor detection module for revoking a traitor using the identified variation and the identified subdivided subtree by removing the identified subdivided subtree from an associated subtree if the subdivided subtree is a leaf of the tree-based media key block.

16. The system of claim 9, further comprising a media player for decrypting the encrypted digital content using the unified media key block and the variant key table.

17. A computer program product having a plurality of executable instruction codes stored on a non-transitory computer usable medium, for performing a unified broadcast encryption and a traitor tracing for a digital content, comprising:
- a set of instruction codes for dividing a tree-based media key block, such that most encryptions in the tree-based media key block do not correspond to individual devices, into S subtrees;
- a set of instruction codes for dividing the digital content into a plurality of segments and converting at least some of the segments into a plurality of variations so that the sum of the number of the segments plus the number of the variations is equivalent to a quantity q;
- a set of instruction codes for upon determination that the absolute value of S is not greater than q/2, subdividing each of the subtrees into q/|S| subdivided subtrees, such that there are greater than two subdivided subtrees;
- a set of instruction codes for assigning a separate media key variant to each of the subdivided subtrees, and storing the media key variant in a variant key table; and
- a set of instruction codes for generating a unified media key block so that the digital content is encrypted by a unified media key block.

18. The computer program product of claim 17, further comprising a set of instruction codes for decrypting the digital content by reading and processing the media key block on a medium to obtain the key media variant required for each of the variations of the digital content.

19. The computer program product of claim 17, further comprising a set of instruction codes for decrypting the digital content by using the key media variant to find an entry in the variant key table.

20. The computer program product of claim 17, further comprising a set of instruction codes for decrypting the digital content by decrypting a title key and locating a variant number from the variant key table using the key media variant.

21. The computer program product of claim 17, further comprising a set of instruction codes for decrypting the digital content comprising the decrypted title key to decrypt and play the segments and the variations.

22. The computer program product of claim 17, further comprising a set of instruction codes for tracing a traitor by identifying a variation and a subdivided subtree used by the traitor to circumvent the encrypted digital content.

23. The computer program product of claim 17, further comprising a set of instruction codes for revoking a traitor using the identified variation and the identified subdivided subtree by removing the identified subdivided subtree from an associated subtree if the subdivided subtree is a leaf of the tree-based media key block.

24. The computer program product of claim 17, further comprising a set of instruction codes for decrypting the encrypted digital content using the unified media key block and the variant key table.

* * * * *